United States Patent [19]

Petursson

[11] Patent Number: 4,493,338
[45] Date of Patent: Jan. 15, 1985

[54] WASHERLESS FAUCET

[75] Inventor: Sigurdur G. Petursson, Mississauga, Canada

[73] Assignee: Waltec, Inc., Ontario, Canada

[21] Appl. No.: 449,770

[22] Filed: Dec. 14, 1982

[30] Foreign Application Priority Data

Jan. 27, 1982 [CA] Canada ............................ 395006

[51] Int. Cl.³ .............................................. F16K 25/00
[52] U.S. Cl. ........................... 137/454.2; 137/454.5; 137/516.29; 251/88; 251/210; 251/267; 251/332
[58] Field of Search ..................... 251/88, 210, 267; 137/454.2, 454.5, 516.29; 251/332

[56] References Cited

U.S. PATENT DOCUMENTS

| 1,379,389 | 5/1921 | Braggington | 137/454.5 |
| 2,208,629 | 7/1940 | Cornell | 251/267 X |
| 2,538,157 | 3/1952 | Olson | 137/516.29 |
| 2,823,006 | 2/1958 | Hare | 251/88 |
| 3,071,344 | 1/1963 | Banks | 251/210 |
| 3,082,786 | 3/1969 | McLean | 137/454.5 |
| 3,411,744 | 11/1968 | Prather | 251/88 |

Primary Examiner—Harold W. Weakley
Attorney, Agent, or Firm—Larson & Taylor

[57] ABSTRACT

Disclosed is a removable cartridge for a fluid valve which uses a simple O-ring to seal with the housing in which the cartridge is received. The valve comprises a body member having an axial inlet opening at one end and at least one transverse outlet opening. A valve seat is secured in the inlet opening and a valve means is positioned in the body member for axial movement toward and away from the seat. The seat extends beyond the body member and has a circumferentially extending groove to receive an O-ring for providing a seal with a housing in which the cartridge is received.

5 Claims, 7 Drawing Figures

WASHERLESS FAUCET

BACKGROUND OF THE INVENTION

This invention relates to a removable cartridge for a fluid valve.

U.S. Pat. No. 4,027,851 of Schlotman, issued June 7, 1977, discloses a cartridge type of valve structure including a seat secured to the cartridge. Removal of the cartridge from its housing also removes the seat which, if necessary, can be replaced. The seat, however, has a fairly complicated structure including a portion which interlocks with a hollow sleeve.

SUMMARY OF THE INVENTION

The present invention provides a removable cartridge for a fluid valve which includes a seat which is sealed with respect to the housing by means of a simple O-ring.

According to a broad aspect of the invention, there is provided a removable cartridge for a fluid valve comprising a body portion having an axial inlet opening at one end and at least one transverse opening, a valve seat secured in said inlet opening, and valve means positioned in said opening portion for axial movement toward and away from said valve seat, said valve seat including a part extending beyond said body portion adapted to receive an O-ring for providing a seal with a housing in which cartridge is received.

The valve means may include a stem portion and a closure portion, the stem portion having male threads cooperating with female threads in the body portion whereby rotation of the stem portion moves the valve means axially towards or away from the valve seat the closure portion being rotatably mounted in the stem portion whereby the stem portion may be rotated without rotating the closure portion when it engages the seat means.

Alternatively, the valve means may include a stem portion and a closure portion, the stem portion being secured in the body member for rotational movement but not translational movement and having an internally threaded bore adapted to cooperate with an externally threaded rod on the closure portion. The closure portion is keyed to the body member to prevent it from rotating but to allow it to move longitudinally whereby rotation of the stem portion moves the closure portion towards or away from the valve seat.

As still another alternative, the valve means may include integral stem and closure portions, i.e. be a single piece. In this case, however, the closure portion rotates on the valve seat.

The closure portion may have a spherically shaped surface for engagement with the seat means and, in one embodiment, the seat means comprises an outer metallic portion having a first flat annular seat and an inner annular portion of resilient material providing a second seat, in which case the valve means has an outer flat annular portion engageable with the first seat and a second spherically shaped portion engageable with the second seat.

The stem portion is preferably of brass, although it could be of stainless steel. The closure portion may be, for example, of brass or of plastic.

DESCRIPTION OF THE PREFERRED EMBODIMENTS

Figure 1:
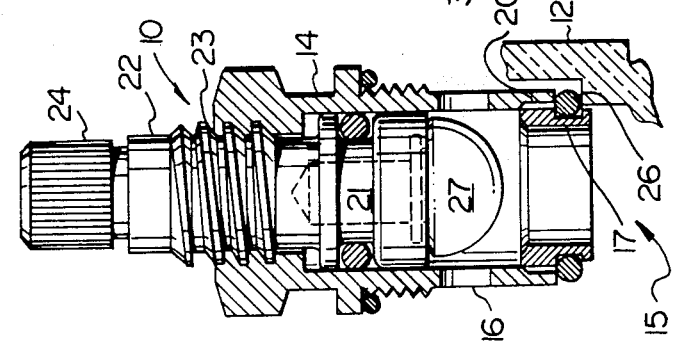
FIG. 1 is a partially cross-sectioned view of a first embodiment according to the invention.

Referring to FIG. 1, a cartridge according to a first embodiment of the invention is generally indicated at 10. The cartridge 10 is receivable in a housing, only a portion of which is indicated at 12. The cartridge comprises a body member 14 having an axial inlet opening 15 at one end and at least one transverse outlet opening 16. A valve seat 17 is secured in the inlet opening 15, as by a threaded connection 20, although it could be secured by welding or staking. A valve means 21 is positioned in the body portion 14 for axial movement toward and away from the seat means 17, such movement being by virtue of the threads 23. That is, by rotating the stem 22, the threads 23 cause the valve means 21 to move toward or away from the seat 17. A handle, not shown, can be connected to the splined portion 24 at the top of the stem 22.

The valve seat 17 extends beyond the body member 14 and has an O-ring 26 for providing a seal with the housing 12 in which the cartridge is received.

The valve means 21 includes the stem portion 22 and a closure portion 27. The closure portion 27 is rotatably mounted on the stem portion 22, as will be further discussed in connection with FIGS. 3 and 4, whereby the stem portion 22 may be rotated without rotating the closure portion 27 when it engages the seat means 17.

In the FIG. 1 embodiment, the closure portion 27 preferably has a spherically shaped surface, as shown, for engagement with the valve seat 17.

Figure 2:
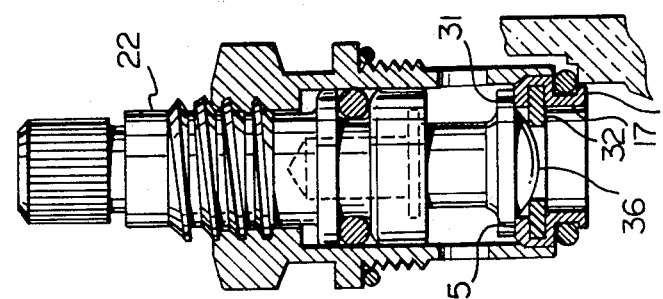
FIG. 2 is a partially cross-sectioned view of a second embodiment according to the invention.

The embodiment shown in FIG. 2 functions in essentially the same manner as the FIG. 1 embodiment, but the structure of the valve seat and closure means are slightly different. In this embodiment, the seat 17 includes an outer metallic portion 30 having a first flat annular seat 31 and an inner annular portion 32 of resilient material, such as vulcanized rubber, providing a second seat. The valve means has an outer flat annular portion 35 engageable with the first seat 31 and a second spherically shaped portion 36 engageable with the second seat. As in the FIG. 1 embodiment, turning the stem 22 moves the closure portion towards or away from the seat means.

Figure 3:
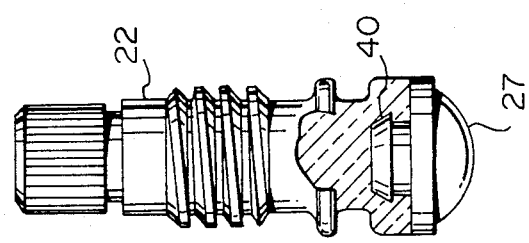
FIGS. 3 and 4 illustrate alternative constructions of the valve means.

FIG. 3 illustrates, partially in cross-section, a valve means comprising a brass stem 22 and a plastic closure means 27. The plastic closure means 27 includes a head portion 40 which snaps into a similarly shaped opening in the lower end of stem 22. The fit is, of course, a loose fit so that the closure member 27 can spin freely with respect to the stem 22.

Figure 4:
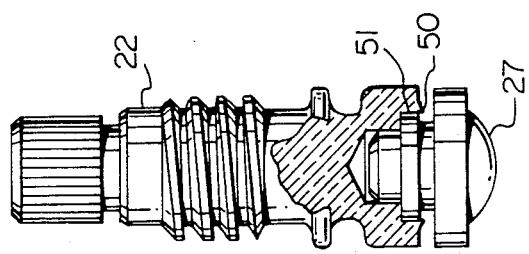

In FIG. 4, the closure member 27 is of brass, as is the stem 22. In this case, the closure member 27 is held in the end of the stem 22 by upsetting the end portion 50 of the stem so that it overlies the rib 51, preventing removal of the closure member 27. Again, of course, the closure member 27 must be free to rotate in the stem 22.

Figure 5:
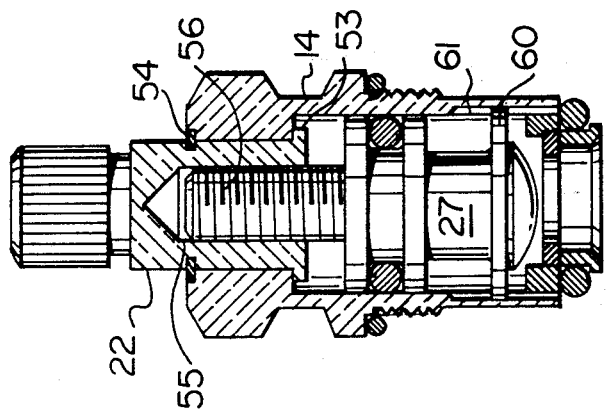
FIG. 5 is a partially cross-sectioned view of a third embodiment according to the invention.

The FIG. 5 embodiment differs from the embodiment of FIG. 2 in that the stem portion 22 does not move longitudinally. The stem portion 22 is retained in body member 14 by a lower annular lip on the stem portion and by a snap ring 54. The stem portion 22 is free to rotate and has an internally threaded bore 55 adapted to cooperate with an externally threaded rod portion 56 on the closure portion 27. The closure portion 27 has a key 60 which slides in a keyway 61 in the body member 14. The key prevents the closure portion from rotating but allows it to move longitudinally in the body member 14. Rotation of stem portion 22 causes the closure portion to move up or down longitudinally because of the threads 56.

Figure 6:
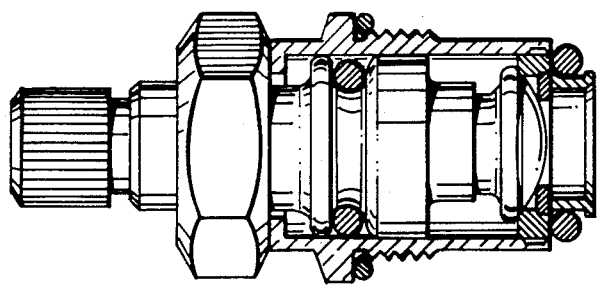
FIG. 6 is a partially cross-sectioned view of a fourth embodiment according to the invention.

The FIG. 6 embodiment has the same type of valve seat and closure portion as FIG. 2 except that the closure portion is integral with the stem and therefor rotates as well as moving longitudinally. This embodiment would be more subject to wear of the seat and closure member because of rubbing between them upon closing and opening.

Figure 7:
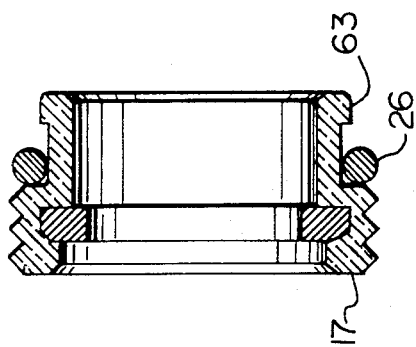
FIG. 7 is an enlarged cross-sectional view of a valve seat according to the invention.

FIG. 7 is an enlarged cross-sectional view of a valve seat 17 showing a lip portion 63 on the outer metallic portion 30 of the seat. The lip 63 serves to retain the O-ring 26 during removal of the cartridge from the body member.

It is expected that those skilled in the art may devise minor variations without departing from the scope of the invention as defined by the appended claims.

What is claimed is:

1. A removable cartridge for a fluid valve comprising a body member having an axial inlet opening at one end and at least one transverse outlet opening, a valve seat secured in said inlet opening, and valve means positioned in said body member for axial movement toward and away from said valve seat, said valve seat including a part extending beyond said body member adapted to receive an O-ring for providing a seal with a housing in which said cartridge is received, wherein said valve means includes a stem portion and a closure portion, said stem portion having male threads cooperating with female threads in said body member whereby rotation of said stem portion moves the valve means axially towards or away from said valve seat, said closure portion being rotatably mounted in said stem portion whereby said stem portion may be rotated without rotating said closure portion when it engages said valve seat, wherein said valve seat comprises an outer metallic portion having a first flat annular seat and an inner annular portion of resilient material providing a second seat and wherein said valve means has an outer flat annular portion engageable with said first seat and a second spherically shaped portion engageable with said second seat.

2. A cartridge as claimed in claim 1 wherein said part of said valve seat includes a lip portion to retain said O-ring during removal of said cartridge from said body member.

3. A cartridge as claimed in claim 1 wherein said stem portion and said closure portion are both brass.

4. A removable cartridge for a fluid valve comprising a body member having an axial inlet opening at one end and at least one transverse outlet opening, a valve seat secured in said inlet opening, and valve means positioned in said body member for axial movement toward and away from said valve seat, said valve seat including a part extending beyond said body member adapted to receive an O-ring for providing a seal with a housing in which said cartridge is received, wherein said valve means includes a stem portion and a closure portion, said stem portion being secured in said body member for rotational movement but not translational movement and having an internally threaded bore adapted to cooperate with an externally threaded rod on said closure portion, said closure portion being keyed to said body member to prevent it from rotating but to allow it to move longitudinally whereby rotation of said stem portion moves said closure portion towards or away from said valve seat, wherein said valve seat comprises an outer metallic portion having a first flat annular seat and an inner annular portion of resilient material providing a second seat and wherein said valve means has an outer flat annular portion engageable with said first seat and a second spherically shaped portion engageable with said second seat.

5. A cartridge as claimed in claim 4 wherein said stem portion and said closure portion are both brass.

* * * * *